L. H. BRINKMAN.
FLEXIBLE TUBE.
APPLICATION FILED SEPT. 7, 1915.
1,198,392
Patented Sept. 12, 1916.
3 SHEETS—SHEET 3.
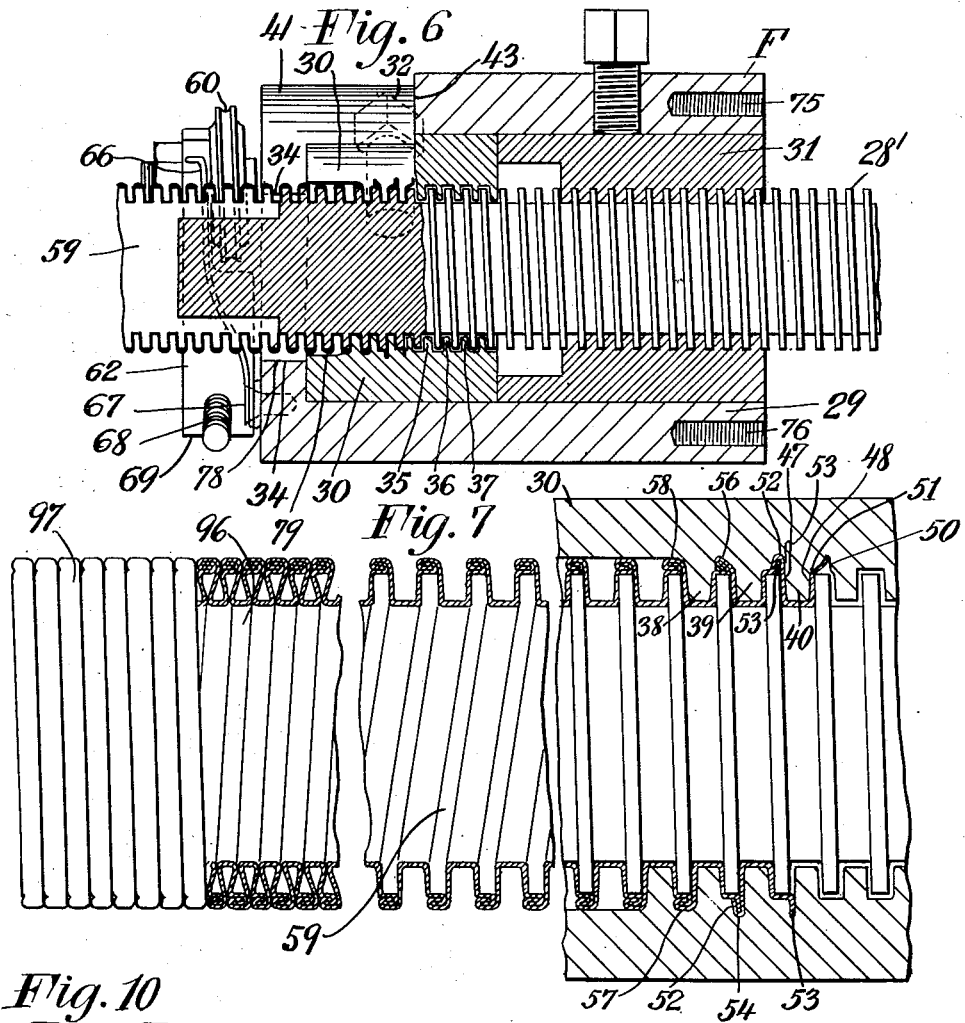
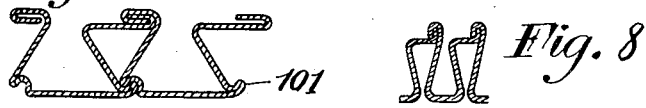
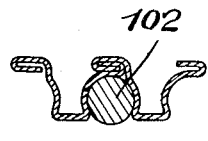
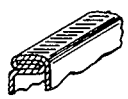
Inventor
Louis H. Brinkman
By his Attorney
Thomas Howe

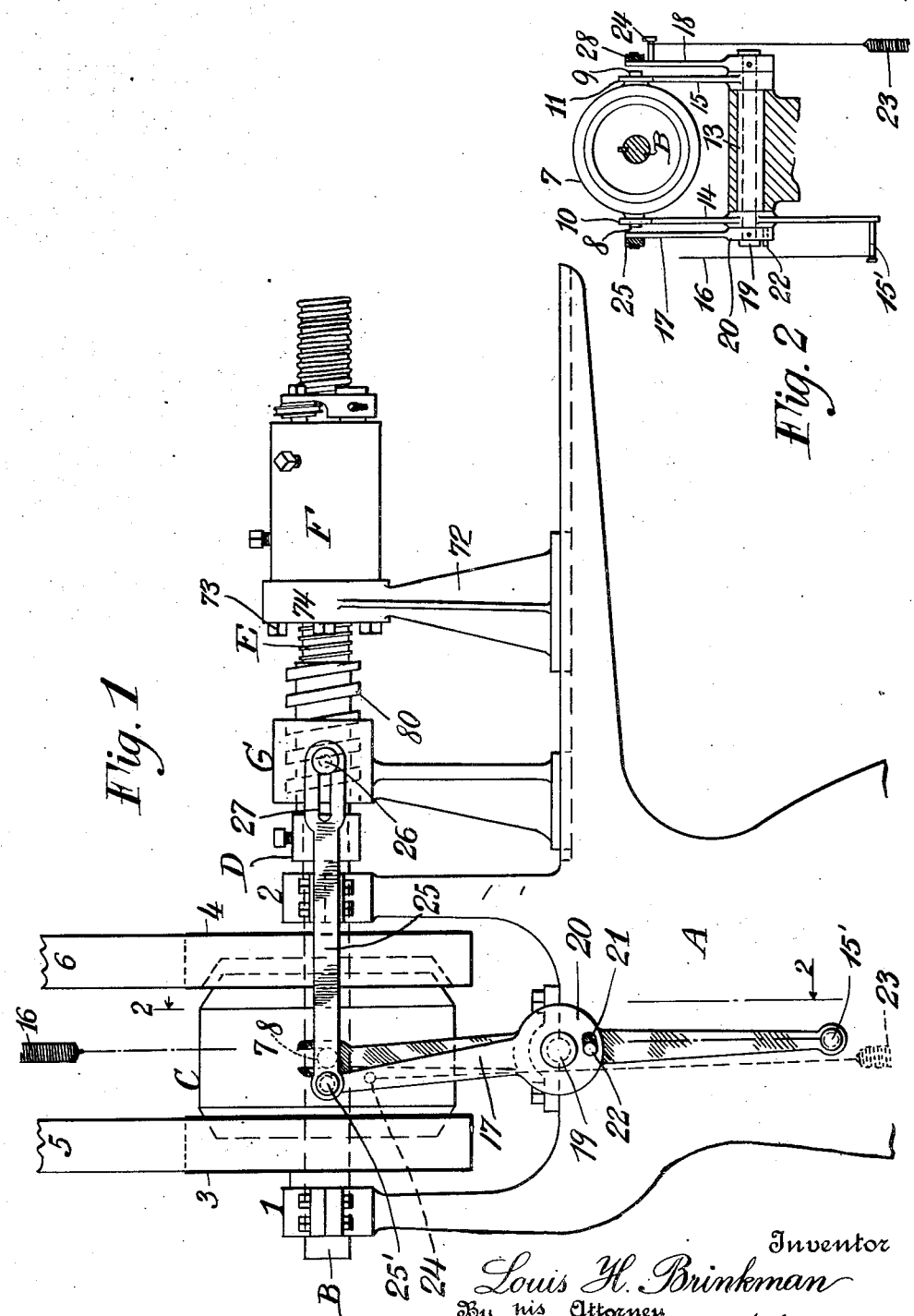

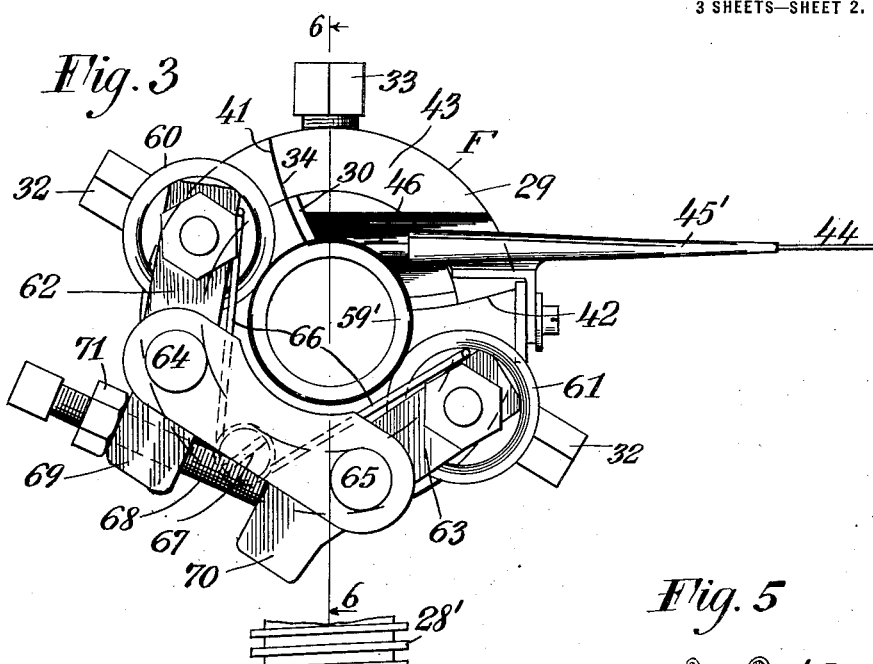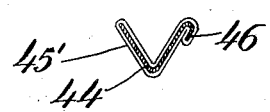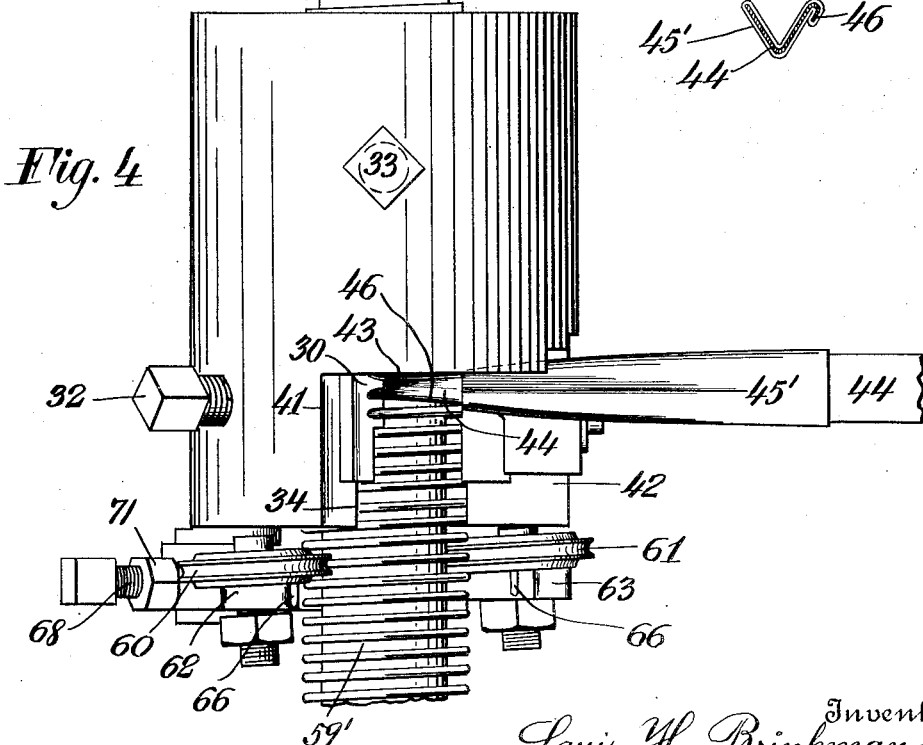

UNITED STATES PATENT OFFICE.

LOUIS H. BRINKMAN, OF GLEN RIDGE, NEW JERSEY, ASSIGNOR TO TITEFLEX METAL HOSE CORPORATION, A CORPORATION OF NEW YORK.

FLEXIBLE TUBE.

1,198,392.  Specification of Letters Patent.  Patented Sept. 12, 1916.

Application filed September 7, 1915. Serial No. 49,258.

*To all whom it may concern:*

Be it known that I, LOUIS H. BRINKMAN, a citizen of the United States, and resident of Glen Ridge, in the county of Essex and State of New Jersey, have invented a certain new and useful Flexible Tube, of which the following is a specification.

This invention relates to flexible tubes.

More particularly the invention relates to a flexible tube formed from a metal strip or ribbon.

Flexible tubes of the character to which this invention relates are adapted to a wide variety of uses such, for instance, as water pipes, steam pipes and pipes for other fluids, conduits for electric wires, etc. In fact such tubes will be found of use in all applications where a pipe or a conduit would be used. Where the improved flexible tube is employed, elbows and other jointing devices at turning points are unnecessary and, generally speaking, the improved tubes are readily adaptable to such forms as may be required under different circumstances of installation without additional parts or special construction. The tubes may also serve as radiators or heat radiating conduits, by making the groove between the convolutions open to a greater or lesser extent to facilitate or retard the radiation as may be desired.

It has been proposed to manufacture flexible tubing from a strip or ribbon, but so far as I am aware, all of such proposals necessarily involve disadvantages in their manufacture or operation. Among these disadvantages may be mentioned sliding at the joints necessary to produce flexibility, (and this requires packing to make a fluid tight joint), the requirement of heat in manufacture and numerous other objections exist, not only as to the manufacture and efficiency but as to the extent of life of the tube.

The improved tube forming the subject matter of this invention is formed of a helically disposed ribbon or strip having the edges of adjacent convolutions interfolded and a bent section, preferably in the form of a groove, extending longitudinally of the strip. The manner of connecting the convolution edges by interfolding lends itself readily to processes of manufacture and a fluid tight joint can be attained by firmly compressing the interfolded parts together. The making of a fixed fluid tight joint as described, however, would substantially destroy the flexibility of the tube except that such flexibility is provided by the longitudinal groove. Even where it is not necessary to make the joint fluid tight and fixed, the groove enhances the flexibility and contributes to the ready manipulation of the tube for the various purposes to which it may be applied. The flexibility and other characteristics of the tube are improved if the sides of the groove are reflexed with relation to the bottom; also the mechanical characteristics of the tube are improved and its interior is smoother and presents less obstruction to the fishing of wires and the like if the interfolded edges are placed at the outside of the tube; also it is preferred to have the bottom of the groove thicker than the sides thereof, the latter tapering off from the bottom so that the whole will be strengthened and, upon flexing of the tube, no undue bending moment will come upon any particular section.

Other and ancillary objects of the invention will appear hereinafter.

The accompanying drawings illustrate an apparatus whereby the improved tube may be formed and also the improved tube itself in several modifications.

Figure 1 is a side elevation of a machine whereby the tube of this invention may be manufactured, some of the extremities being omitted so as to bring the illustration properly within the compass of the sheet and which will be readily understood from the description, with some parts in section. Fig. 2 is a section on a reduced scale through the frame and headstock spindles on the line 2—2 of Fig. 1, looking in the direction of the arrow, the clutch and clutch shifting members being shown in elevation. Fig. 3 is an end elevation, on an enlarged scale, of the tube forming nut or die and its appurtenant apparatus. Fig. 4 is a top plan view of the same. Fig. 5 is an end view of the preliminary strip former feeding the strip into the forming threads of the die and screw, the view being of the end nearest the die and the strip emerging from the former being shown in section. Fig. 6 is a section on the line 6—6 of Fig. 4, looking in the direction of the arrows, and Fig. 7 is a still further enlarged sectional view of the tube and that portion of the nut immediately involved in its formation, showing more clearly the details of construction of the tube and of its formation by the die and screw. Figs. 8 to 12 inclusive are fragmentary views and illustrate modifications.

Referring to the drawings, the apparatus comprises a support or frame A upon which is mounted a headstock comprising the rotatably mounted spindle B, the reversible driving mechanism C therefor and the chuck D. Within the chuck is secured a screw-rod E carrying a screw thread which coöperates with a longitudinally movable nut F to form the tube. Also the screw rod has a thread engaging with a longitudinally moving nut G for appropriately reversing the direction of rotation of the rod.

Referring to the drawings more in detail, the spindle B of the headstock is supported in the bearings 1 and 2 and rotatably mounted upon it are the belt pulleys 3 and 4 upon which run the belts 5 and 6 driven in opposite directions by any suitable source or sources of power. Splined upon the spindle is a movable clutch member 7 which may be slid longitudinally to alternately engage the pulleys 3 and 4.

In order to shift the movable clutch member to reverse the direction of rotation of the chuck and screw rod, and to securely hold it in the position to which it may be moved, the clutch member has extending laterally from it two trunnions 8 and 9 which are embraced by the forks 10 and 11 at the ends of a yoke journaled in the frame. The yoke comprises a sleeve 13 to the ends of which the arms 14 and 15, carrying the forks 10 and 11, are fixed. The yoke is held in position to cause driving engagement with one of the pulleys 3 or 4 by an off-center spring 16 having one end secured at 15' to an extension of the arm 14, and the other end to a suitable stationary point. To move the yoke, the arms 17 and 18 are fixed upon a shaft 19 which passes through and is rotatable in the sleeve 13. The arm 17 is provided with a disk 20 having a slot 21 which receives a pin 22 fixed to the extension of the arm 14 of the yoke. An off-center spring 23 has one end connected to the arm 18 at 24 and has its other end secured to a fixed point. The pin 22 and slot 21 provide a connection which permits movement of the arms 17 and 18 with relation to the yoke until the spring 23 has passed center. The arms and yoke are then thrown together quickly into the position for reverse rotation, the spring 23 being stronger than the spring 16. The spring 16 serves to hold the clutch in closed position during transition movements of the shifting mechanism. The arm 17 is moved in one direction or the other by means of a link 25 which is pivoted to the arm at 25' and is connected with the nut G by a pin 26 and slot 27. The slot permits quick movement of the arm 17 after its spring has passed dead center. A similarly connected link 28 extends between the arm 18 and the nut G upon the other side. Forward and backward movement of the nut G along the rod E operates to throw the clutch member from one extreme to the other so that the direction of rotation of the spindle, chuck and screw rod is reversed at regular intervals for a purpose as will hereinafter appear.

The parts directly concerned in the formation of the tube comprise the nut F coöperating with the threads 28' on the screw rod together with appurtenant appliances. The nut comprises a steel casing 29 having a central bore adapted to receive a steel die 30 and a brass bushing 31 closely fitting against it, the die and bushing being held in position and prevented from movement with relation to the casing by means of set screws 32 and 33 as shown. It will be observed that the bore just spoken of does not extend entirely through the casing but that there is a smaller bore at one end so that the flange 34 is formed against which the die abuts. The diameter of the bore inside this flange is such as to allow the passage of the tube as formed by the die and screw. The bushing 31 may be threaded to receive the rotating screw threads with a running clearance as shown, and the steel die may have certain non-forming threads, as 35, 36, 37, etc., and it carries specially formed threads 38, 39, and 40 adapted to form the strip into the tube. After the tube forming threads have been passed the die has an unthreaded interior surface.

To permit the strip of which the tube is formed to be fed into the die from the side, the casing 29 and the die have segments cut away as shown particularly in Figs. 3 and 4, forming a recess having side walls 41 and 42 and an end wall 43. Secured to the wall 42 of the recess is a channel or former 45' for preliminarily shaping the ribbon prior to its introduction into the die. This former is flat at one end where it receives the flat ribbon 44 and at its other end is shaped as shown in Fig. 5. It will be observed that this former initiates a longitudinal groove 45 in the strip and one edge is curled over as shown at 46. The ribbon passes from the former 45' into the die, the bottom portion of the groove being between the top of the die thread 40 and the screw at the base of the screw threads. The sides 47 and 48 extend up on both sides of the die thread 40. The side 48 is bent to have a right angled section in conformity to the outline of the die thread 40 and has its extremity 50 bent into a radial position in a slot cut in the die at the base of the thread. The width of this slot is such as to be substantially equal to the thickness of the ribbon or strip of which the tube is formed. Similar clearances are formed between the screw and the die at the base of the die thread at 51 and also about the die thread 40 except that at the outer face of the die thread the clearance is made larger and the adjacent ends of the clearances at the sides of the thread are made larger, gradually tapering off to clearances at the base of the die thread which are substantially equal to the thickness of the ribbon. This increased clearance at the inner face of the die thread and at the sides as described, provides space for the swaging or thickening of the metal which takes place. This thickening of the bottom of the groove in the strip is of advantage as will be hereinafter again referred to. The curled over edge of the side 47 is entered within a channel 52 at the base of the die thread 40. This channel is of slightly more than the width of three thicknesses of ribbon at the start. The curled over portion received from the preliminary former is more sharply bent on entering the channel and consequently its tendency is to spring against the sides of the channel, leaving a clearance for one thickness of the ribbon between the sides of the bent over portion. Within this clearance is entered the radial edge 53 of the preceding convolution, this edge corresponding to the edge 50 of the convolution being considered. The strip maintains this sectional shape following the die thread 40 about the screw, except that the channel 52 is narrowed as it progresses about the screw so that the bent over edge of the strip and its embraced radial edge of the next convolution are pressed more closely together as shown at
54. The strip then emerges from the die into the recess and reënters the die about the die thread 39. The right hand radial side (as viewed in Figs. 6 and 7) is now embraced by the curled over portion of the edge of the succeeding convolution and its left hand edge, interfolded with the preceding convolution will enter within a channel 56 cut in the die at the thread base. This channel is formed at its beginning of a section as shown at 56 with an inclined wall which bends over the interfolded edges to one side. This section is gradually merged into the section as shown at 57 as it progresses about the die until the interlocked portions are bent down and occupy the position as shown at 57, the clearance between the die and thread being substantially equal to four thicknesses of the ribbon. In this condition the joined edges of the strip emerge from the die into the recess and are entered into a similarly shaped clearance 58 of similar depth between the die and screw threads. The joint may be then passed around the screw one or more times without changing form and the tube emerges from the nut having the sides of the groove in the strip substantially radial of the tube, the bottom of the groove upon the inside of the tube and the interfolded edges of contiguous convolutions of the strip at the outside of the tube, the section of the tube being then as shown at 59 and exterior elevation as at 59'. The tube then passes on between the grooved rollers 60 and 61 which bear upon the joint and bring the parts firmly together so as to insure a tight and shapely joint in case such has not been already accomplished. It will be observed that the rollers are set in a plane which makes an angle with the longitudinal axis of the tube corresponding to the helical pitch of the strip so that the rollers are adapted to the helical form of the joint. The rollers may conveniently be rotatably mounted upon arms 62 and 63 pivoted to the end of the casing of the nut at 64 and 65. These arms are engaged by the ends of a spring 66 which tends to throw them away from the tube, the spring being secured to the end of the nut casing at its center 67. The rollers are forced against the tube by means of a screw 68 tapped into the tail 69 of one of the arms 62 and bearing against the tail 70 of the other arm 63. Obviously by turning this screw in one direction or the other the pressure of the rollers upon the tube may be adjusted as desired. A lock nut 71 on the screw provides for securing the arms and rollers in adjusted position. As the rollers bear against opposite sides of the tube they have no tendency to bend it to one side or the other.

The nut F as described, is secured to a stand or support 72 sliding upon the frame. This may be done by means of machine screws 73 passing through the head 74 and tapped into the nut casing, the casing being tapped for this purpose at 75, 76, etc. The head 74 has a central opening to permit the passage of the screw E. It will be observed that between the rollers and the end of the die threads there are several convolutions of the thread on the screw which have no corresponding threads on the die or nut casing, the die and casing presenting plain faces 78 and 79 to the screw threads.

It will now be apparent that the strip having been entered between the die and screw as indicated, the turning of the screw will frictionally grip the strip and draw it into the die so that a tube will be formed as described. The turning of the screw, however, causes the nut F to travel along the screw member, and unless the tube sections to be formed were very short, the apparatus would have to be very long to accommodate the travel of the nut. For this reason provision is made for returning the nut to its starting point at suitable intervals. This is the object of reversing the direction of rotation of the screw member as before referred to. In the case shown the forming thread on the screw member is a right hand thread, as is also the thread 80 for the nut G. As, therefore, the screw member is rotated in a clockwise direction, viewed from the headstock, the strip will be drawn in and the tube formed as described, the forming nut moving toward the head stock and the shifting nut G moving in the same direction. As the nut G moves back and forth it shifts the clutch as has been referred to.

The operation of the apparatus in its entirety may now be traced.

The end of the metal is entered in the former 45' in which it has a groove initiated and one edge curled over as described. From the former it is entered within the die or nut at the first forming thread as described and, the screw being turned, the strip is passed through the forming threads of the die and on about the screw under the grooved rollers 62 and 63 when the tube emerges from the nut. As it enters the rollers it is of a longitudinal section as shown at 59. In passing through the forming channels, it will be observed that the clearances are such as to force the interfolded edges tightly together and the folding of one part about the other draws them tightly together at the bends so that a fixed tight joint is formed. The form as shown in section at 59 may be the final form, and for some purposes may be best, but the tube may be compressed or reflexed later into a form, section of which is shown at 96. The exterior view of the tube is shown at 97.

Let it be assumed that the flat strip has been passed through forming channels of the die and further that the apparatus is in the phase of operation as indicated in Fig. 1. In this position the apparatus has just completed a tube forming period, the nut G is substantially at the extremity of its left hand movement (see Fig. 1) and the forming nut F is substantially at the left hand extremity of its movement. The driving clutch has been thrown to the left into engagement with the pulley 3 so that the belt 5 driving the pulley in a counterclockwise direction, viewed from the left hand end, turns the screw rod in a similar direction. This will result in the withdrawal of the screw from the nut and from the tube or strip, the latter being backed off sufficiently to release the torsional gripping between it and the screw. The nut F then moves toward the right carrying with it the strip and tube, there being no turning of the latter in this movement. During this operation, the shifting nut G is also carried to the right. At a certain point in its travel, depending upon the adjustment, the clutch member operating levers are moved past center and the clutch member is thrown to the right into engagement with the pulley 4. It will be apparent that the arrangement of levers and off-center springs is such that the shifting of the clutch is brought about practically instantaneously so that there is no material discontinuance of the operation. The pulley 4 revolving in the opposite direction from that of the pulley 3, the direction of rotation of the screw will now be reversed. As the screw thus turns, the strip will be held to it by a torsional frictional grip so that it turns with the screw, the sufficiency of this frictional grip being insured by the extra turns of the strip about the screw in addition to those turns under the forming threads. The drawing of the strip in and through the nut operates to form a groove longitudinally of the strip, winds the strip into a helical form and interfolds the edges of adjacent convolutions, forcing these edges tightly together so that a fixed and fluid tight joint is formed. The tube then passes on under the rollers 60 and 61 as before described. During this operation, it being observed that the screw does not move longitudinally, the forming nut moves to the left (see Fig. 1) the screw and strip turning within it. This is kept up as long as the screw is turned in the direction indicated. During the left hand travel of the forming nut the shifting nut G is carried to the left until, at a certain predetermined point, the driving clutch is again shifted to the position shown in the drawings. The parts of the machine will then occupy positions as shown in Fig. 1 and a cycle of operation has been completed and may be repeated indefinitely as long as it may be desired to operate the machine.

The tube, of section as shown at 59, as it is delivered by the forming nut and screw may be used as it is but if desired it may be compressed axially by passing a rod through it, the rod having nuts at the ends of the tube. Pressure is then brought to bear on the ends of the tube by turning the nuts and the tube may thus be compressed longitudinally. The grooved walls may thus be reflexed and the tube formed to have a longitudinal section as shown at 96 and an exterior as shown at 97. Also the tube might be compressed in a hydraulic press or in other suitable ways.

It will be observed that in the tube as shown at 59, and also as shown at 95, the interfolded parts forming the joints between the convolutions positively engage with each other so that they are held against relative movement either radially or longitudinally of the tube. It will be seen that the extreme edge of each convolution extends to and abuts against the bottom of the fold of the adjacent convolution, there being no clearance, so that the interfolded parts are positively held against movement with relation to each other longitudinally of the tube. Also, the parts interfolded together being pressed closely together radially of the tube, they positively engage each other to prevent relative movement in a radial direction. The result of the positive engagement is that the parts are held permanently immovable with relation to each other. They are relatively immovable under all conditions; only upon destruction of the tube can movement take place. The term "positive" is here used in the same sense which it would ordinarily convey in mechanics. It means that the engagement is a rigid connection unavoidable except upon breakage or abnormal distortion of the parts as distinguished from the well known non-positive engagements such as frictional engagements.

Fig. 8 illustrates a fragment of a tube section wherein the interfolded strip-edges are not bent down to one side of the helical meeting line of the convolutions.

Fig. 9 illustrates a tube section fragment wherein a second strip 98 wound helically about the tube has its edges bent to interlock with grooves 99 and 100 in the tube strip. This subsidiary strip reinforces the tube against longitudinal expansion or extension. Another arrangement for this purpose is shown in Fig. 10, wherein adjacent convolutions are interlocked, the bottom of the groove at one side having a hook 101 and an oppositely extending hook at the other side so that the opposed hooks of adjacent convolutions are adapted to interlock as shown. In the structure as illustrated in Fig. 11, the tube is reinforced by a wire 102 wound inside the tube between the convolutions.

To more securely hold together the folded edges of the strip forming the tube, the joint may have indentations made upon it as shown in Fig. 12.

While the invention is illustrated in what are considered its best applications, and a preferred form of apparatus for making it has been shown, the invention may have other embodiments and be produced by other apparatus. It is not therefore limited to the structures, or to manufacture by the apparatus, shown in the drawings.

What I claim is:

1. A flexible tube comprising a helical strip having edges of adjacent convolutions interfolded, said strip having a longitudinal fold or groove, and the parts interfolded together having positive engagement with each other holding them permanently from relative movement longitudinally and radially of the tube.

2. A flexible tube comprising a helical strip having edges of adjacent convolutions interfolded and said strip having a longitudinal fold or groove, the said interfolded edges being at the outermost portion of the wall of the tube.

3. A flexible tube comprising a helical strip having edges of adjacent convolutions interfolded, said strip having a longitudinal fold or groove, the bight of the groove being thicker than its sides.

4. A flexible tube comprising a helical strip having edges of adjacent convolutions interfolded, said strip having a longitudinal fold or groove with its sides reflexed with relation to its bottom.

5. A flexible tube comprising a helical strip having edges of adjacent convolutions interfolded in fixed relation and forming a fluid tight joint, said strip having a longitudinal fold or groove, the bight of said groove being thicker than its sides, said sides being reflexed with relation to its bottom, the said interfolded edges being at the outermost portion of the wall of the tube and the bottom of the groove being at the innermost portion of the wall of the tube.

6. A flexible tube comprising a helical strip having edges of adjacent convolutions interfolded, said strip being bent transversely to provide flexibility, and the parts interfolded together having positive engagement with each other holding them permanently from relative movement longitudinally and radially of the tube.

7. A flexible tube comprising a helical strip having a longitudinal groove and edges of adjacent convolutions interfolded at the outermost portion of the wall of the tube and bent to one side of the substantially helical line at which the convolutions meet.

8. A flexible tube comprising a helical strip having edges of adjacent convolutions interfolded, said strip having a longitudinal fold or groove, and the parts interfolded together having the extremity of the edge of one convolution extending to the bottom of the fold in the other convolution, there being no clearance between the said extremity and the bottom of the fold against which it abuts, forming a positive engagement holding the interfolded parts permanently against relative movement of the parts longitudinally of the tube, said interfolded parts being pressed together radially of the tube, there being no clearance between them radially of the tube, forming a positive engagement holding the interfolded parts permanently against relative movement radially of the tube.

Signed at New York in the county of New York and State of New York this 4th day of September, A. D. 1915.

LOUIS H. BRINKMAN.